J. O. ELLINGER.
ELECTRIC WELDING.
APPLICATION FILED JULY 15, 1910.
1,055,261.
Patented Mar. 4, 1913.
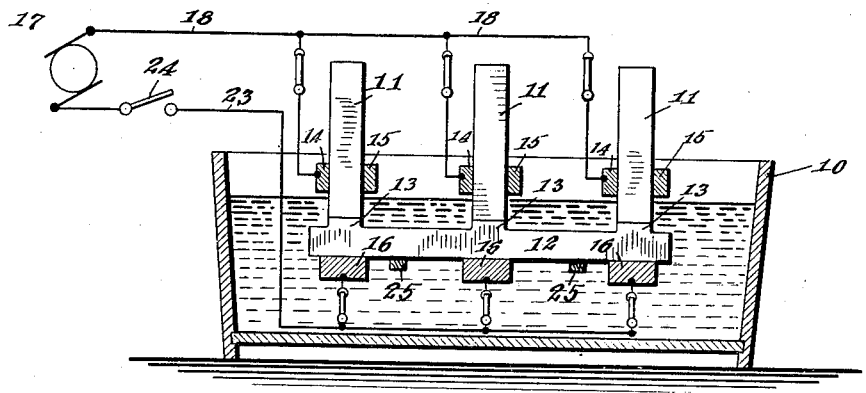
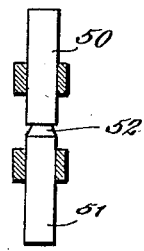
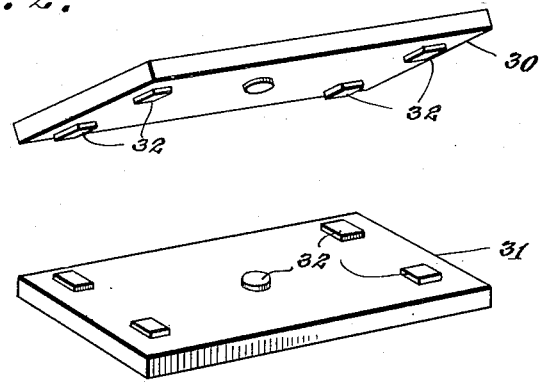
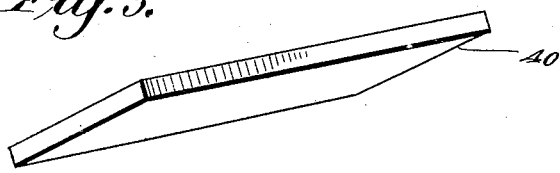
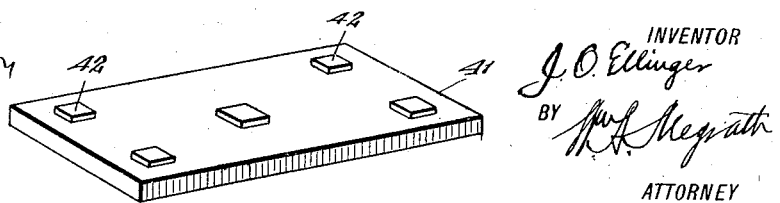
WITNESSES
INVENTOR
J. O. Ellinger
BY
ATTORNEY

UNITED STATES PATENT OFFICE.

JULIAN O. ELLINGER, OF NEW YORK, N. Y., ASSIGNOR, BY DIRECT AND MESNE ASSIGNMENTS, OF ONE-HALF TO UNIVERSAL ELECTRIC WELDING COMPANY, OF NEW YORK, N. Y., A CORPORATION OF NEW YORK.

ELECTRIC WELDING.

1,055,261.     Specification of Letters Patent.     Patented Mar. 4, 1913.

Application filed July 15, 1910. Serial No. 572,100.

*To all whom it may concern:*

Be it known that I, JULIAN O. ELLINGER, a citizen of the United States, and a resident of the city, county, and State of New York, have invented certain new and useful Improvements in Electric Welding, of which the following is a specification.

The methods of electric welding hitherto practised are open to the objection that the weld removed the temper of the two parts united, and this temper was not taken out to the same degree in each part. Hence, after the electric weld was made it became necessary to anneal the metal again, and this was necessary whether or not the same amount of temper was taken out of each part.

The purpose of the invention is to overcome this disadvantage by carrying out the process under conditions which prevent a removal of temper necessitating a reannealing of the metal. This purpose is accomplished, according to the present invention, by producing the weld while the parts being thus united are at their places of union, surrounded by a fluid of liquid or gaseous nature which is of low conductivity or high resisting power. Oil is the fluid preferably employed.

In the accompanying drawings there are shown various types of parts or members which are capable of being united by the process herein set forth, but it is to be understood that these particular embodiments are intended merely to be suggestive and exemplary of various forms and relations of members which may be united by the present process. The process is not in any wise restricted to the forms and relations of the members herein illustrated and may be practised with other forms without departure from the spirit of the invention or the scope of the subjoined claims.

In said drawings: Figure 1 illustrates an apparatus suitable to carry the present process into effect and shows the process as applied to the electric welding of a flat bar or plate having members welded to its surface in endwise engagement therewith. Fig. 2 is a perspective view illustrating two plates which are provided with welding projections on each meeting face by which the two plates may be welded together. Fig. 3 is a similar view showing the welding projections on one plate only. Fig. 4 is a view showing two members or bars to be welded together end to end.

Similar characters of reference designate similar parts in the several views.

In the present process the parts or members to be weldably united are suitably connected with terminals of a suitable source of electrical energy so as to form part of an electrical circuit, and are subjected to pressure, whereby coalescence and integral union of the metal is effected at the place of contact, all as is now well known in the art. But either before or after the members have been connected with the terminals, and before they are subjected to the welding current and pressure referred to, they are placed in a suitable receptacle for a material of low conductivity or high resistance, preferably oil, so that their places for union will be surrounded by such material, and the weld is produced while the parts in contact with each are surrounded by such material. When oil or material of like nature is employed, the receptacle may be a tank open at the top, such as is shown in Fig. 1 and is marked 10. When the fluid employed is of a gaseous nature the tank employed should be a closed one.

Where a series of members, as 11, Fig. 1, are to have their ends weldably united to a member as 12, in spaced relation along the length of the latter, the said member is prepared for welding, preferably by reducing its area at the place for contact or weld. In Fig. 1 this has been exemplified by showing the member 12 as formed with projections 13 for contact with the ends of the members 11. These projections may be in the form of spots or ribs, according to the requirements. The members 11 and the member 12 are suitably connected with terminals of a welding machine. In the arrangement exemplified in Fig. 1, each of the members 11 is shown as clamped between elements 14 and 15 forming a terminal of an electric welding machine, while the member 12 is shown as in contact with a block or blocks 16 forming the other terminal of said machine. If desired, only one terminal 14—15 and one terminal or block 16 may be provided to engage the members 11 one after another, to weld them successively to the member 12, instead of simultaneously as contemplated by the exemplified arrangement. These terminals are suitably connected with a suitable source of electrical energy, as a generator, indicated at 17 as by the wires 18—23 respectively, in the exemplified arrangement, though the number and arrangement of wires will depend upon the number and arrangement of members 11 which is intended to weld simultaneously to the member 12. A switch, as indicated at 24 is preferably included in the circuit. In this exemplified arrangement the tank is provided interiorly with supports 25 of suitable nature for holding the members to be welded above the bottom of the tank.

In Fig. 2, two flat plates marked 30 and 31 are prepared for welding by forming each of the same at their places for union with projections 32, forming lugs; while in Fig. 3, two flat plates marked 40 and 41 are prepared for welding by forming only one of the same (40 for example) with projections 42. In Fig. 4 is shown two bars, 50 and 51, which may be welded end to end.

In all of the instances illustrated and hereinabove described, the meeting point or line of contact of the separate pieces of metal must be entirely surrounded by the bath and be below the level of the oil or other liquid when the same is used. The oil may be heated and in some instances it is preferable that it be heated. If other material or medium than oil is used, of course, it may also be heated.

Having now described my invention, what I claim as new and desire to secure by Letters Patent is:

1. The herein described improvement in the art of electric welding, adapted to prevent the withdrawal of the temper of the parts by the heat which they attain in the welding operation, said improvement consisting in subjecting the parts to a welding current of electricity and to pressure while said parts are submerged in oil.

2. The herein described improvement in the art of electric welding, adapted to prevent the withdrawal of the temper of the parts by the heat which they attain in the welding operation, said improvement consisting in subjecting the parts to a welding current of electricity and to pressure while said parts are submerged in oil whose temperature is above normal.

3. The herein described method of electrically welding a plurality of bars to a plate with the ends of the bars united to the side of the plate and said bars in a spaced relation upon the latter, said method consisting in forming the plate with one or more projections, placing the ends of the bars upon said projection or projections submerging the plate and the ends of the bar in oil, subjecting the plate and the bars to a heating current of electricity and to pressure localized at the places for weldable union while submerged in oil.

In witness whereof I have hereunto set my hand at the city, county and State of New York, this 28th day of June, 1910.

JULIAN O. ELLINGER.

In presence of—
AGNES C. O'CONNELL,
ISABEL R. RICHARDS.